US012711253B2

(12) United States Patent
Steele

(10) Patent No.: US 12,711,253 B2
(45) Date of Patent: Aug. 18, 2026

(54) CONSUMER ACCESS DEVICE

(71) Applicant: KRAKEN TECHNOLOGIES LIMITED, London (GB)

(72) Inventor: Philip Renwell Steele, London (GB)

(73) Assignee: KRAKEN TECHNOLOGIES LIMITED, London (GB)

(*) Notice: Subject to any disclaimer, the term of this patent is extended or adjusted under 35 U.S.C. 154(b) by 88 days.

(21) Appl. No.: 18/720,978

(22) PCT Filed: Dec. 15, 2022

(86) PCT No.: PCT/GB2022/053252
§ 371 (c)(1),
(2) Date: Jun. 17, 2024

(87) PCT Pub. No.: WO2023/111576
PCT Pub. Date: Jun. 22, 2023

(65) Prior Publication Data

US 2025/0063030 A1 Feb. 20, 2025

(30) Foreign Application Priority Data

Dec. 15, 2021 (GB) ..................................... 2118215
Dec. 15, 2021 (GB) ..................................... 2118216

(51) Int. Cl.
*G06F 21/60* (2013.01)
*H04L 9/40* (2022.01)

(52) U.S. Cl.
CPC ........... *G06F 21/606* (2013.01); *H04L 63/08* (2013.01)

(58) Field of Classification Search
None
See application file for complete search history.

(56) References Cited

U.S. PATENT DOCUMENTS 9,838,390 B2 12/2017 Zakaria
10,887,447 B2 1/2021 Jakobsson et al.
2005/0198118 A1* 9/2005 Viger ................ H04N 21/8153 707/E17.121
2007/0276908 A1* 11/2007 Asthana ................ H04M 3/567 709/204
2015/0024686 A1* 1/2015 Hrabak .................. H04W 4/48 455/41.2
2017/0249661 A1* 8/2017 Alzate Perez ......... G06N 20/00
(Continued)

OTHER PUBLICATIONS

International Search Report and Written Opinion issued in PCT/GB2022/053252, mailed Mar. 3, 2023.

*Primary Examiner* — Raqiul A Choudhury
(74) *Attorney, Agent, or Firm* — Meunier Carlin & Curfman LLC

(57) ABSTRACT

A Consumer Access Device (CAD) (610) is arranged to obtain utility (608) consumption data from, for example, a smart meter (not shown). The CAD (610) is also programmed to link to further CADs (612). (614) located at other premises and the linking process may be managed by a utility supplier server (618). Once linked, the CADs may communicate via the server or via a peer-to-peer arrangement. Applications executed on the CADs allow consumers to interact with other households over their energy usage—for example to compete over reducing such usage. In a preferred embodiment, the CAD may be programmed to download applications from an online store.

20 Claims, 9 Drawing Sheets

(56) References Cited

U.S. PATENT DOCUMENTS

2020/0084060 A1* 3/2020 Bang .................... H04L 12/282
2020/0403991 A1* 12/2020 Sohail ................. H04L 63/1433
2020/0404495 A1* 12/2020 Hegde ................. H04L 63/0853
2021/0103673 A1* 4/2021 Atwater ................... G01D 4/00
2021/0142601 A1 5/2021 Schoenfelder et al.
2021/0326866 A1* 10/2021 Hurry .................. G06Q 20/382
2022/0019995 A1* 1/2022 Ngo ..................... G06Q 20/385

* cited by examiner

CONSUMER ACCESS DEVICE

CROSS REFERENCE TO RELATED APPLICATIONS

This application is a national stage application under 35 U.S.C. 371 of PCT/GB2022/053252 filed on Dec. 15, 2022, which claims priority to United Kingdom Application No. 2118215.9 filed on Dec. 15, 2021 and claims priority to United Kingdom Application No. 2118216.7 filed on Dec. 15, 2021, each of which are incorporated herein by reference in their entirety.

The present invention relates to a consumer access device (CAD) for use with at least one smart meter (or other usage measurement device) which can interact with at least one other consumer access device. The present invention further relates to methods of linking CADs and methods of interaction between CADs.

Consumer access devices are known to be provided to domestic utility consumers to inform them of their current energy consumption and also communicate some data to the cloud. In more sophisticated cases they can also inform a consumer when a cheaper tariff is available. Generally speaking, CADs are intended to encourage lower and/or smarter energy consumption.

One problem is that a typical consumer struggles to truly understand or get a “feel” for their energy consumption. Energy data can be rather dry and it can be difficult to generate enthusiasm within a household for saving energy.

It is an object of the present invention to ameliorate this problem.

According to the first aspect of the present invention there is provided a consumer access device for a smart energy system, the consumer access device comprising:

a processor, first memory for storing at least one application, second memory for secure storage of data representing utility usage, first communication means for receiving secure data representing utility usage, and second communication means for communicating with at least one server, and the processor being programmed to store secure data representing utility usage received via the first communication means in the second memory, the processor also being programmed to execute at least one application stored in the first memory, the processor further being programmed to request that the server establish a link to another consumer access device, the processor additionally being programmed to respond to a request from a server to establish a link with at least one further consumer access device, to accept the request.

The Consumer Access Device referred to herein is distinct from a smart utility meter and an in-home display (IHD). A smart meter is concerned with accurately and securely uploading data collected regarding utility usage within premises. Since it would be beneficial for utility customers to modify this data (in order to defraud the utility company) the smart meter must be a secure device. Typically, various tamper-proof and encryption techniques are deployed in the smart meter to ensure that accurate and unadulterated data are transmitted to the utility supplier. For example, the utility customer is never able to update the data or software resident on the smart meter. While over-the-air (OTA) updates of smart meters may be performed, this is a secure process managed entirely by, or on behalf of, the utility company. However, the smart meter may provide data locally on a read-only basis, for example over ZigBee™.

An in-home display is a device that receives usage data, typically from a smart meter, and displays this to the utility customer. Such devices may have different display modes, such as current usage of electricity, usage so far on a daily, weekly or monthly basis and so on. They may also indicate when a usage threshold has been exceeded. However, they are only capable of receiving data from the smart meter (such as over ZigBee™) and displaying it to the customer.

In contrast to the smart meter, a Consumer Access Device or CAD is capable of modification by the consumer. The CAD does not need to be arranged for secure relaying of utility usage data to a utility company server as this will be performed by the smart meter directly. This means that the CAD may be modified (for example by way of a software download) in response to consumer request.

In contrast to the in-home display, a CAD is a smart device capable of being programmed at the direction of the consumer. In this context, the term “programmed” means the installation of software that was not included in the device when provided to the consumer. This is distinct from “programming” a device by selecting the display of certain information, for example from a menu. This selection or customization is a “dumb” process since the software to provide all such displays is already installed or at least not installed at the request of the consumer. The software for installation is preferably developed by third-party developers unrelated to the utility company and selected by the consumer from a remote source such as an application store. The software is preferably downloaded via the internet (such as via a WiFi router in the premises) and is not provided via the smart meter in any way. This has the benefit of not employing the secure connection between a smart meter and a utility company for data traffic that does not require such a secure connection.

The CAD is capable of receiving utility consumption information directly from a smart meter, for example over ZigBee™. This distinguishes the CAD from another device, such as a tablet or smartphone, that receives utility consumption information from a utility company server (i.e. information already uploaded by a smart meter and provided by way of an app on the consumer's device). This allows the CAD to operate using near-real-time data which would be impossible using the existing infrastructure since the smart meter usually only uploads data every 24 hours (typically for 48 half-hourly time periods). While it would, in theory, be possible to upload data from the smart meter (e.g. via DCC) more frequently, the load on the communications network would be unsustainable.

The software selected by the consumer preferably utilises utility consumption data provided by a secure portion of the CAD that receives the data directly from a smart meter. This allows third-party software developers to develop applications that are directly relevant to the consumer, for example an improved display of consumption data or an energy-reduction game. By providing a CAD with “secure” and “open” portions, security of utility usage data is preserved while allowing third party developers access to the platform. By empowering the development community to provide apps from consumers, customer engagement is enhanced and this could also provide a revenue stream to the utility provider (if consumers pay for apps). The consumer access device preferably further comprises a display.

This aspect of the invention provides a consumer access device (CAD) that is capable of interacting with another CAD located at another premises, such as the house of a friend or family member. One possible interaction would be to play a game, such as a game involving reduced or smarter energy usage. Another possible interaction would allow somebody to monitor, via their CAD, the energy usage of another household such as a vulnerable person living alone. This could provide early warning of a problem at the vulnerable person's premises.

To improve accountability, the consumer access device is preferably programmed to obtain confirmation from a consumer prior to accepting the request from the server.

While the CAD includes at least one pre-installed application, it may also be programmed to download new applications for the consumer access device.

The CAD is preferably further programmed to pair with at least one user device to provide a user interface. This allows the CAD to comprise only basic I/O or UI features to reduce cost.

The CAD is preferably further provided with a third communication means comprising a short range wireless transceiver such as a Bluetooth™ transceiver.

The first communication means preferably comprises a ZigBee™ transceiver and the second communication means preferably comprises a WiFi™ transceiver.

In order to enhance flexibility, the CAD is preferably further arranged to communicate with more than one smart utility meter to receive utility data representing consumption of more than one utility.

According to a second aspect of the present invention there is provided a method of linking at least two consumer access devices located at separate premises so that their respective consumers can interact via their consumer access devices, the method comprising:

- receiving, from a first consumer access device or a first user device associated with a first consumer access device, an indication of the identity of another consumer,
- confirming that the another consumer has a second consumer access device,
- sending an invitation to the second consumer access device or to a second user device associated with a second consumer access device, the invitation identifying the consumer associated with the first consumer access device, and
- in response to a positive reply from the second consumer access device or from a second user device associated with the second consumer access device, storing data identifying that the first and second consumer access devices are linked and communicating link data to the first and second consumer access devices.

The indication of the identity of the another consumer may comprise at least one of street address, customer number, customer name, postal code and property number, and unique consumer access device identity.

According to a third aspect of the present invention, there is provided a method of communicating data to both a first consumer access device according to the first aspect of the invention and a second consumer access device according to the first aspect of the invention, the method comprising:

- receiving, at a server, a request from a first consumer access device or a first user device associated with the first consumer access device to communicate data to the first and second consumer access devices,
- confirming that the first and second consumer access devices comprise linked consumer access devices, and
- communicating the data to the first and second consumer access devices.

The linking data may comprise address data for peer-to-peer linking of the first and second consumer access devices.

This method allows a two-player game to be provided across two separate CADs. Each player uses their user device (or an interface built into the CAD) to control the gameplay and the game is displayed on both of the CADs. The server is preferably programmed to also communicate data from a user device associated with the second consumer access device to communicate data to the first and second consumer access devices.

For certain games, for example action games such as Pong, the server is preferably further programmed to periodically transmit the same data to the first and second consumer access devices. This allows the displays of the CADs to be updated more-or less simultaneously and to display the same image. In some circumstances it will be desired to show different images such as YOU WIN to the victor and YOU LOSE to the loser.

According to the fourth aspect of the present invention there is provided a method of communicating between a first consumer access device according to the first aspect of the invention and a second consumer access device according to the first aspect of the invention, the method comprising:

- receiving, at a server, a request from the first consumer access device to communicate data to the second consumer access device,
- confirming that the first and second consumer access devices comprise linked consumer access devices, and
- sending the data to the second consumer access device.

This aspect is concerned with CAD-to-CAD transmission and has particular application to protection of vulnerable consumers. Should the first CAD detect an uncharacteristic energy consumption pattern in the home of a vulnerable consumer, then carers, friends or family members can be informed by way of an alarm signal sent to their respective CADs.

Since the carers may not be at home, the server is preferably also programmed to send the data to at least one user device associated with the second consumer access device.

According to a fifth aspect of the present invention there is provided a method of sharing energy usage data between at least a first consumer access device according to a first aspect of the invention and a second consumer access device according to the first aspect of the invention, the method comprising:

- receiving energy usage data from the first consumer access device, and
- sending energy usage data to the second consumer access device.

The sending of energy usage data may occur over a peer-to-peer connection to reduce load on the server.

The sending of energy usage data may occur via a server to provide enhanced visibility and control of the data sharing process.

In either case, the energy usage data from the first consumer access device is preferably abstracted before sending it to the second consumer access device. This abstraction reduces the accuracy or granularity of the data, improving the security of the consumer's data.

According to a fifth aspect of the present invention, there is provided a consumer access device for a smart energy system, the consumer access device comprising:

- a processor,
- first memory for storing a plurality of applications,
- second memory for secure storage of consumer utility usage, first communication means for receiving secure data representing utility usage, and second communication means for communicating with at least one server to download at least new applications for the consumer access device, the processor being programmed to store secure data representing utility usage via the first communication means in the second memory, the processor also being programmed to download a plurality of applications to the first memory and to execute applications stored in the first memory, the processor further being programmed in response to a request for secure data from an application, to provide the secure data to the application.

By providing a secure consumer access device that is capable of downloading, storing and executing applications that can utilise energy consumption data opens up a whole host of possibilities, such as allowing third parties to develop applications. Third party applications could focus on presenting usage data in a readily-appreciated format that may even be customised by the consumer. Games could be developed to encourage a reduction in energy use and/or smarter energy use and alarms could be provided to warn the consumer of certain events. Such events could be a faulty appliance, lights remaining on into daylight hours or a TV left on in an unoccupied room. Such events could also be use of electricity above a threshold and/or for more than a predetermined period of time. The alarm preferably comprises at least an audible alarm.

The consumer access device may include a display but is preferably programmed to pair with a user device, such as a smartphone, tablet or PC, to provide a consumer with more sophisticated UI options. The interface to the user device is preferably arranged only to carry secure data in encrypted form. This permits a CAD to be provided at modest cost (since it does not need to provide sophisticated UI options) while not compromising the security of sensitive consumer data. The CAD may be further arranged to abstract the secure data representing energy usage prior to providing that data to the user device. The abstraction of the data may be performed over time periods and/or in respect of magnitude of usage.

The CAD can preferably be paired with more than one user device and the consumer is preferably able to limit the number of such devices. User devices may also be paired in a hierarchy so that different devices are allowed different levels of access to, and/or control of the CAD. For example, a single user device may be able to instruct downloading/updating and deletion of applications, while other user devices may be able to control which application(s) are executed and to play games. The first user device paired with the CAD may be such a master or administrator's device.

The consumer access device preferably also comprises as a third communication means a short range wireless transceiver, such as a Bluetooth™ transceiver, to allow the CAD to be securely paired with one or more such user devices.

In one embodiment the processor is programmed to provide data to an application by storing that data in a portion of the first memory that is unique to the application. This prevents other applications obtaining more data than they are entitled to access. The processor may instead (or additionally) be programmed to provide the secure data to an application using a public/private key pair.

The first communication means preferably comprises a ZigBee™ transceiver. This provides secure communication between a smart meter and the CAD.

The second communication means preferably comprises a WiFi™ transceiver. This provides low-cost access to the Internet but could equally be replaced or augmented by a mobile data link.

The consumer access device preferably also comprises a fourth communication means for communicating with appliances on the premises. The fourth communication means could comprise a Machine-to-Machine (M2M) transceiver and/or a powerline transceiver.

The CAD is preferably programmed to receive consumption data in respect of more than one utility. For example, the CAD may be programmed to receive data from two smart utility meters.

The CAD may be programmed to execute the plurality of applications in succession. Successive applications may be launched after a predetermined time (that may differ between applications) or in response to user input. This allows the consumer to toggle to the application of interest rather than have to wait and the consumer can decide which. Alternatively, the CAD may be programmed to execute some or all of the applications in a sequence selected by the consumer. Some applications ("background applications") may be arranged to execute in succession until a consumer requests execution of a particular application ("foreground application") such as a game. The user may also customise their experience within applications by selecting one display ("card") and also selecting the particular information displayed on a card.

The CAD is preferably programmed to inform the consumer of the data that will be shared with a particular application before download to ensure that consumer privacy obligations are not breached. In respect of certain applications, the consumer may select the extent to which data is shared or even customise the accuracy of the data shared. Where the consumer limits data sharing to lower accuracy data, this may impact the quality or responsiveness of the application. The provider of the application may specify a minimum level of data accuracy.

According to a seventh aspect of the present invention there is provided a home area network comprising at least one smart meter, a consumer access device according to the fifth aspect of the invention and a user device, the at least one smart meter arranged to transmit data representing utility usage to the consumer access device in encrypted form, and the consumer access device and the user device being arranged to interact via a server.

According to an eighth aspect of the present invention there is provided a method of operating a consumer access device in accordance with the fifth aspect of the invention, the method comprising:

sending a request, by the processor under control of one of the plurality of applications, for secure data representing utility usage stored in the second memory, receiving the request, by the processor under control of secure software, for secure data, verifying the request, by the processor under control of secure software, to ensure that the one of the plurality of applications is entitled to the requested secure data, sending, by the processor under control of secure software, the requested secure data to the one of the plurality of applications.

The step of sending the requested secure data preferably comprises storing the secure data in a container in the first memory, which container is unique to the one of the plurality of applications.

The method preferably further comprises abstracting the secure data representing utility usage before sending the data to the one of the plurality of applications.

By arranging for the processor to have two separate roles (i.e. application execution and secure data management) confidentiality of user consumption data is preserved.

According to a ninth aspect of the present invention there is provided a method of pairing a consumer access device according to the sixth aspect of the invention with a user device according to the sixth aspect of the invention, the method comprising:

- sending a message, from the user device to a server, requesting that the user device be paired with the consumer access device,
- receiving, at the user device, a reply from the server, the reply instructing user activation of the consumer access device,
- sending, by the consumer access device, at least one message to the user device,
- sending, by the user device, at least one message to the consumer access device,
- receiving, at the user device, the at least one message from the consumer access device,
- receiving, at the consumer access device, the at least one message from the user device,
- storing, at the consumer access device, pairing information received from the user device, and
- storing, at the user device, pairing information from the consumer access device.

By pairing a consumer access device with a user device, the consumer may use the sophisticated user interface provided, for example, on a smartphone to control the CAD. This permits the CAD to be a simpler device and allows for cost savings relative to a CAD with a full interface (for example a touch screen).

The method of pairing may alternatively comprise:

- receiving, at a server, a message from the user device, the message requesting that the user device be paired with an identified consumer access device,
- confirming, at the server, that the user device is associated with the same consumer as the consumer access device, and
- storing, at the server, pairing information for the user device and the identified consumer access device.

This variation on the method has the advantage of requiring less sophisticated hardware at the consumer access device.

According to a tenth aspect of the present invention, there is provided a method of downloading an application to a consumer access device according to the fifth aspect of the present invention, the method comprising:

- requesting, by a message from a user device to a server, an application to be downloaded,
- receiving, at the consumer access device, the application software from a server,
- installing, at the consumer access device, the application software, and
- receiving, at the user device, confirmation of the installation.

By controlling the download of CAD applications from a user device, the CAD may be provided with only a rudimentary user interface (UI) which reduces cost and complexity.

DESCRIPTION OF THE FIGURES

The present invention will now be described, by way of example, with reference to the accompanying drawings, in which.

DETAILED DESCRIPTION

Figure 1:
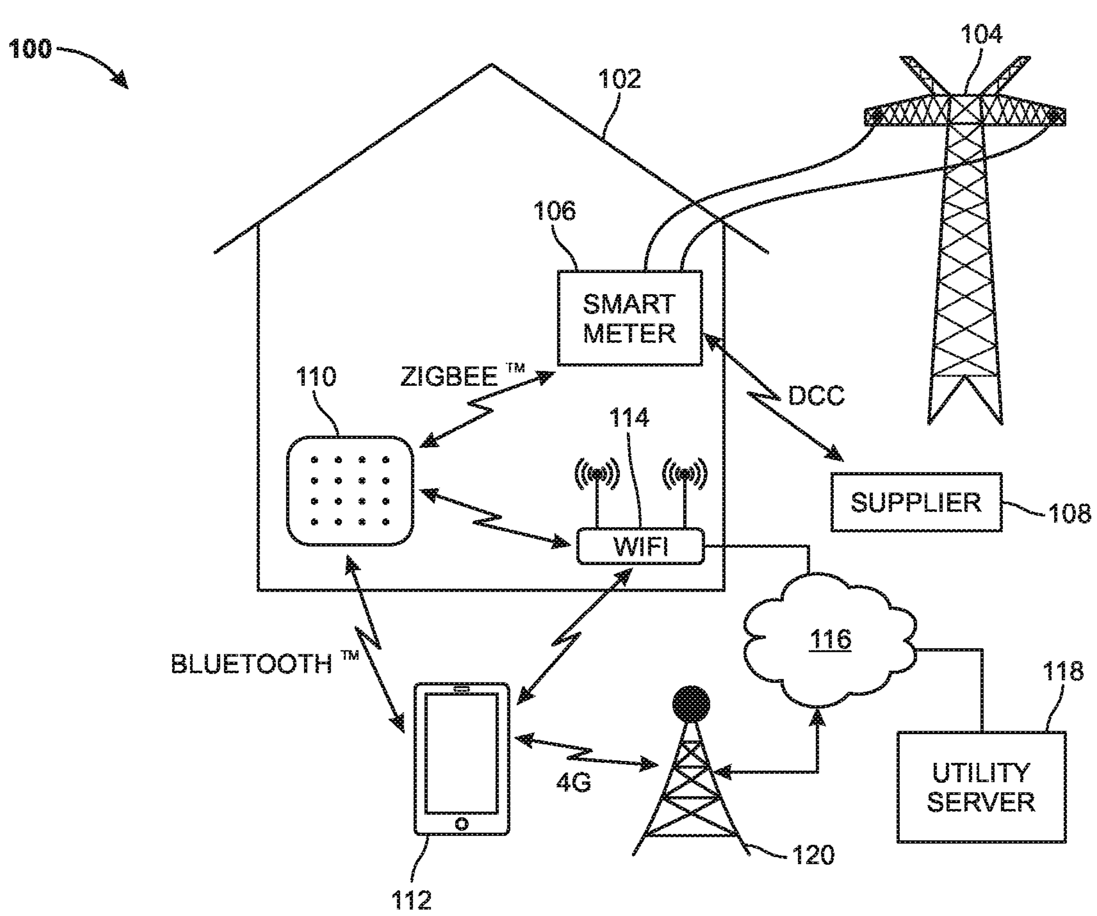
FIG. 1 is a block schematic diagram of a smart energy system or home area network according to an embodiment of the present invention.

FIG. 1 shows a block schematic diagram of a home area network (HAN) 100 including a consumer access device (CAD). A house 102 receives electricity from the grid 104 via a smart meter 106. The smart meter at least provides consumption data on a frequent basis and may optionally have other functionality such as knowledge of tariff information. The smart meter sends consumption data to an electricity supplier 108, for example via the Data Communications Company (DCC) infrastructure. Typically this data is sent overnight and comprises utility usage data for every 30 minute period during the day. This data is used by the supplier for, at least, charging the consumer for their usage. The smart meter also provides data more frequently, for example every 10 seconds via ZigBee™, to a Consumer Access Device (CAD) 110. This frequently-provided data will be referred to as the "10 second data" throughout this document regardless of the exact frequency at which it is transmitted. ZigBee™ is a secure short range (approximately 100 metres) radio protocol used by smart meters, more detail is available at https://zigbeealliance.org/solution/zigbee/. The CAD in this embodiment is provided with two further radio interfaces-Bluetooth and WiFi.

The Bluetooth interface is used, as will be described further below, for pairing the CAD with a consumer's user device 112 such as a smartphone or tablet. The WiFi interface is used, via a WiFi router 114, to provide the CAD with internet access (although cellular data may additionally or alternatively be used). This permits the CAD to obtain tariff data from a supplier server via the internet 116, to download applications and to interface with the consumer's device via a supplier server 118. The consumer's user device 112 may, of course, access the internet and supplier server over WiFi and/or via a cellular radio system 120. As an alternative to a smartphone or tablet, the consumer may interface with the CAD via a laptop or other device. References in this document to using an application on a smartphone or user device also encompass using a laptop or similar device via a web interface.

The CAD may be provided with a sophisticated user interface (UI) such as a touch screen, meaning that there is no requirement for the user device 112. However, it is preferred to exploit the UI of the user device 112 to reduce the cost of the CAD. In a preferred embodiment the CAD includes only a 24×12 pixel display and an activation button. In another preferred embodiment the CAD has no display or alarm and uses the user interface (UI) of one or more user devices to interact with the consumer.

The CAD may be provided with communication to appliances (not shown) within the house to manage when certain tasks are performed. For example, operation of a dishwasher or charging an electric car may be timed according to availability of the most-favourable tariff.

While in this example a CAD is illustrated that interfaces to the electricity supply, it will be understood that this could relate instead or in addition to other metered utilities such as gas. The CAD could also interface to other utilities such as heat-as-a-service in which a number of properties receive heat from a communal heat-pump array. Such utilities typically measure the fluid flow and/or temperature of the fluid provided to each property and one or both of these parameters could be provided to the CAD and processed as required.

While the utility consumption data is provided by a smart meter in this example, it could be provided by other means, such as a CT clamp. Such devices encircle one of the mains supply cables and typically provide a current reading every 30 seconds.

Figure 2:
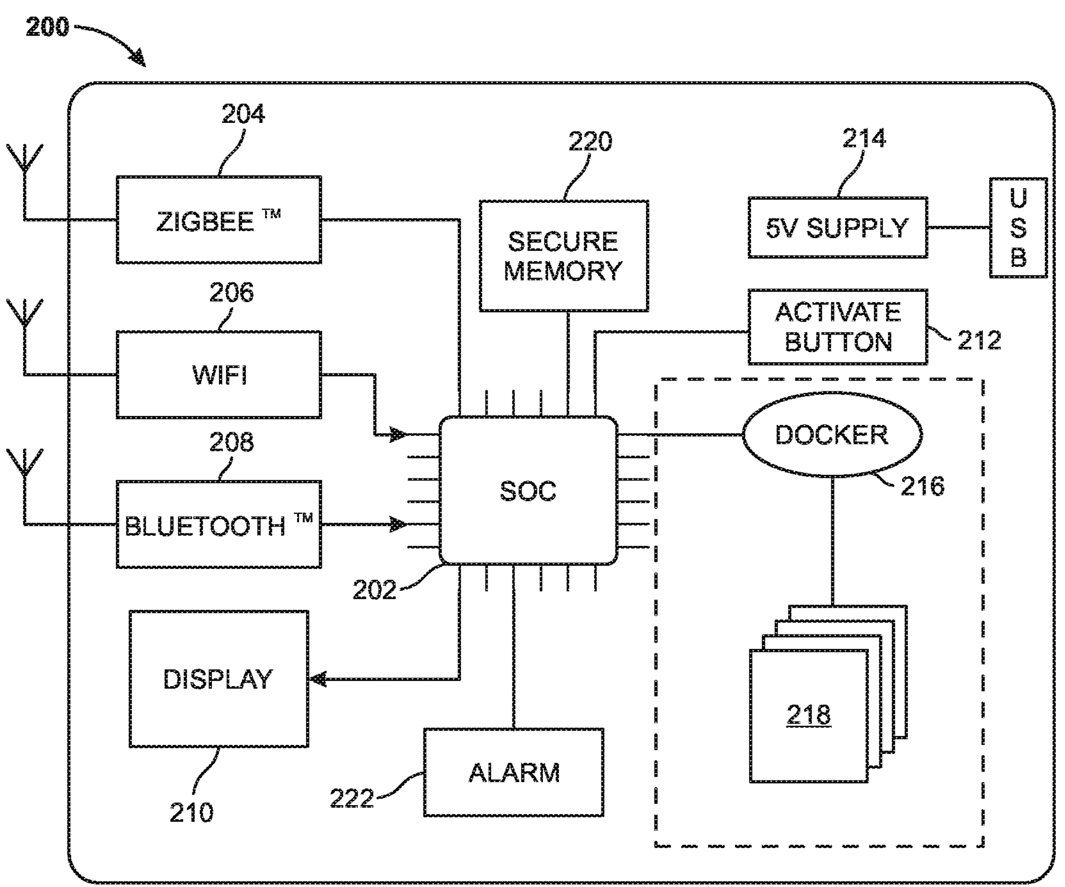
FIG. 2 is a block diagram of a Consumer Access Device (CAD) according to an embodiment of the invention.

FIG. 2 shows a more detailed diagram of a CAD 200 suitable for use in the Smart Energy System shown in FIG. 1. A processor 202 comprises a System-on-Chip (SoC) including memory and one or more processors as are available from a number of semiconductor manufacturers. For communication, the processor interfaces with a ZigBee™ transceiver 204, a WiFi transceiver 206 and a Bluetooth™ transceiver 208. Although each of these transceivers is shown as having its own antenna for clarity, the transceivers may share an antenna to save cost and space. Certain manufacturers also provide WiFi and Bluetooth™ transceivers on a single chip. To interact with a consumer, the CAD also comprises a display 210 and an activate button 212. In this example the display is a matrix of 12×24 LEDs but other displays will be equally appropriate. The display shows images known as "cards". In some embodiments the display is optional since information can be displayed to a consumer using their user device. In addition, the CAD may be provided with a voice activated interface (not shown). A 5 volt power supply 214 is provided via a USB socket which may be provided with a battery back-up as desired. When the CAD is provided with a powerline transceiver (not shown) the power supply is also capable of sending and receiving data, for example with appliances on the premises, via the electricity cabling in the premises. A secure memory 220 is provided either on the SoC or an a stand-alone entity and an optional alarm 222, such as an audible alarm, is provided for warning a consumer.

The figure also shows, within the dotted lines, a number of applications 218 stored in the memory of the processor 202. These applications are managed and executed by Docker™ 216 which allows different software (arranged in "containers") to be run separately while sharing kernel functions in the processor. A key point to note is that data can be provided to a particular application by placing that data in a particular application's container. Applications may not access the contents of other application's containers, preserving security. Further information may be found at https://www.docker.com/. Docker™ saves computer resources when compared with a virtual machine (VM) architecture but a VM architecture may equally be used. Downloading and removing applications is discussed in more detail below.

Each CAD has a MAC address, install code, serial number and security certificate (for ZigBee™ communication) that are all unique to the device and generally stored in the secure memory 220.

The processor 202 assumes at least two roles-firstly a secure role in which the consumer consumption or usage data is received via the ZigBee™ transceiver 204 and stored in the secure memory 220. Secondly, an application execution role in which it executes the applications 218 (in cooperation with Docker™ 216).

The CAD preferably comprises a sleep mode which is exited when the activate button 212 is pressed. Alternatively, the CAD may operate at all times in which case the activate button may be omitted. The activate button may also be used by the consumer to instruct the processor to toggle to execute a desired application or to instruct pairing to a user device as discussed further below.

Once activated, the processor of the CAD executes the applications according to a policy set by the supplier, although this may be customised by the consumer. In the simplest example, the applications are executed in rotation—each application is given sufficient time to display any output to the consumer before the display goes blank and another application is given access to the processor and display. Alternatively, the applications may be executed in order of priority and/or provided with an override function in which an application having crucial information to display is given exclusive access to the processor. A number of "background" applications may be arranged to execute continuously until overridden by a "foreground" application such as a game. Any policy may be governed to some extent by the arrival of the 10 second data from the smart meter.

The display screens generated by the applications are known as cards. The consumer has control (for example via the user interface on a paired user device) of which cards will be displayed by each application and which data is used to generate that card. For example, a consumer has three applications installed in their CAD:

10 second data
electric car battery status
weather forecast.

The 10 second data application displays "live" energy consumption and includes a number of different cards which use different graphical displays. The user selects one of these cards and arranges for the 10 second application to be displayed for at least 20 seconds.

The charge/discharge condition of the car battery changes less frequently and so the user arranges the car battery status application to execute every minute and display the battery status for 10 seconds.

The weather forecast changes less frequently but requires more attention from the consumer. In this case the consumer arranges for the weather forecast application to be displayed every two minutes for 30 seconds. The exact scheduling may have to vary slightly to accommodate the consumer's requests.

The apps may be installed or removed as described further below.

Preferably, the CAD is pre-programmed with at least one application such as a Snake game. The consumer may control the game using controls on the CAD (not shown) such as buttons or a touchscreen. Preferably, however, the user interface is provided using another device such as a smartphone which includes a CAD application and has been paired to the CAD. Further CAD functionality will be described with reference to the following flow diagrams.

While a CAD has been described which has a display 210 and alarm 222, these elements may be omitted and the user interface provided on a paired user device (112, FIG. 1) as described further below.

The CAD may be provided with an interface to allow hardware upgrades such as additional sensors and user interface functions. The skilled reader will be familiar with such arrangements.

Figure 3:
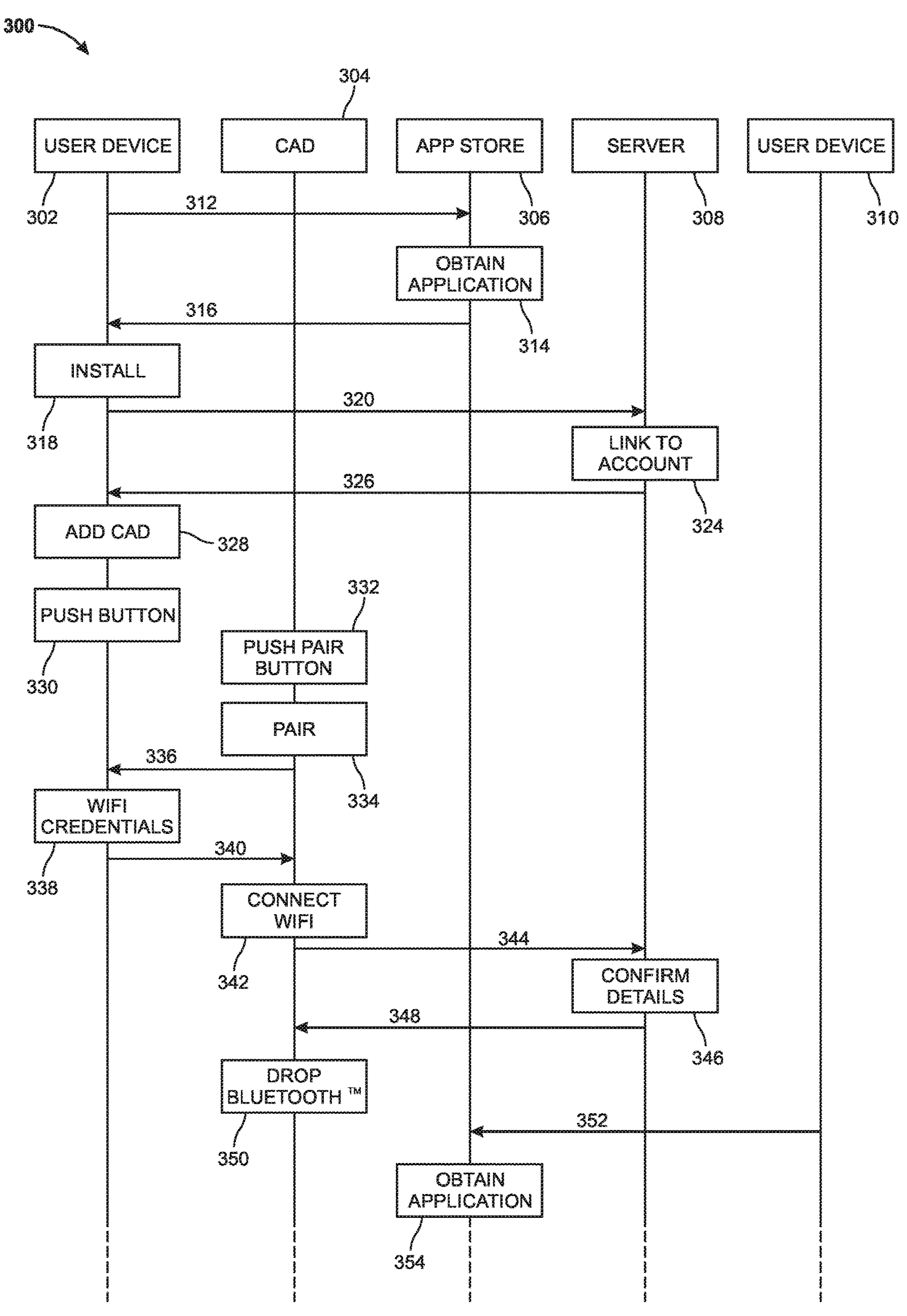
FIG. 3 is a flow diagram explaining how a CAD is paired with a user device.

FIG. 3 shows a flow diagram 300 illustrating the steps for pairing a CAD with a user device such as a smartphone, tablet or PC. The user device provides the home area network with a sophisticated UI for the consumer while keeping the cost of the CAD itself low. Once the CAD and a user device are paired, the CAD retains control of sensitive consumer data-generally using the user device only as a simple input/output device, or at least limiting the granularity of the data provided to the user device.

The figure shows four participants in the process: user device 302, CAD 304, App Store 306 and utility company server 308 as well as an optional further user device 310.

At step 312 the user device 302, in response to a request by a consumer, sends a request to an App Store 306 to download the utility company CAD application. The App Store is an existing entity providing applications for user devices and can be accessed and searched in known manner. At step 314 the App Store locates the relevant application and sends it to the user device at step 316 which installs it at step 318. Several steps known the skilled reader have been omitted from this application download and install process for clarity.

Once the application is installed on the user device 302, the user device contacts the supplier server 308 at step 320 to link the user device with the correct utility company consumer account. The server confirms details and links the user device to the consumer's account at step 324 and sends a confirmation message back to the user device at step 326.

The user device 302 is now ready to pair with the CAD 304. From a menu in the user device application, the consumer selects "add new CAD" at step 328 although this function could be automatic (because there is no paired CAD visible to the application in the user device). The application then activates the Bluetooth™ functionality of the user device to establish a Bluetooth connection to the CAD. Again, steps have been eliminated for clarity—for example, the user device will typically have to ask the consumer if the utility company application may access the user device's Bluetooth™ functionality. At step 330, the application instructs the consumer via the screen of the user device to press a "pair" button on the CAD. This may be done, for example, by holding the activate button for a predetermined period such as 15 seconds. This eliminates the requirement for a separate "pair" button on the CAD but ensures that the consumer will not accidentally initiate the CAD/user device pairing in normal use.

Once the consumer has instructed the CAD to enter the pair routine at step 332, the CAD and the user device pair at step 334 according to normal Bluetooth™ protocols (not shown). Once the CAD and the user device are paired, the CAD proceeds to transmit, via Bluetooth, identification and/or configuration data such as its MAC address, serial number and install code at step 336. Optionally, the application on the user device may display these details to the consumer so that they can verify the details against a label on the CAD 304. Using a short range wireless connection such as Bluetooth™ ensures that the correct user device and CAD are paired in this process.

The CAD needs to be connected to WiFi so at step 338 the user device requests and receives WiFi credentials from the consumer and these are provided to the CAD at step 340. The CAD then connects to the WiFi router (not shown) at step 342. The WiFi router and the communications between it and the CAD have been omitted for clarity. The CAD could equally be connected to the WiFi router using WiFi Protected Setup (WPS).

Now that the CAD is connected to the internet, it sends a request 344 to the utility company server 308 which includes credentials such as its MAC address, serial number and a security key. These credentials uniquely identify the CAD to the server which confirms and stores the details as appropriate at step 346 and sends a confirmation message to the CAD at step 348. The CAD then drops the Bluetooth connection at step 350. It is necessary for the CAD to communicate with the server over the internet before the Bluetooth™ connection is dropped to ensure that the WiFi has connected successfully.

Further user devices 310 may be set up in the same manner—the start of the procedure is shown at steps 352 and 354. Subsequently paired user devices may have limited functionality such as an inability to download applications to the CAD or change CAD settings.

While a pairing based on Bluetooth™ has been described, the skilled reader will appreciate that other techniques are available to securely identify the user device such as a CAD generating a one time code and displaying that code on the CAD so that it can be entered into the user device by the consumer. Another possibility is that the CAD has a unique code printed on it during manufacture or delivery and once the consumer has entered this code, the server can uniquely identify the CAD and user device to be paired. In these scenarios, the CAD does not require a Bluetooth transceiver.

Figure 4:
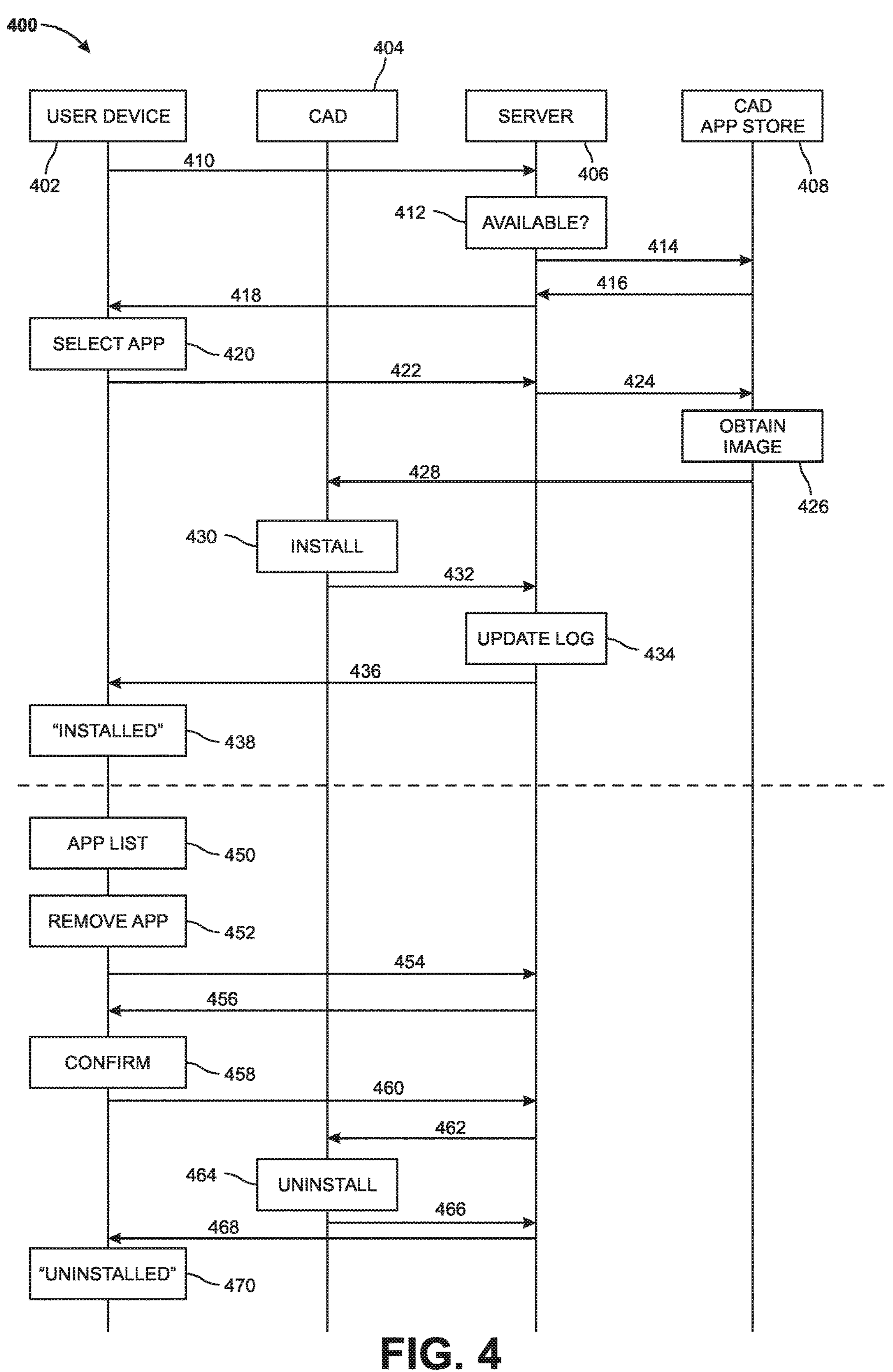
FIG. 4 shows the steps to downloading of a third party application.

FIG. 4 shows a flow diagram 400 illustrating downloading of applications to a CAD and deletion of applications from a CAD. The user device associated with the CAD interfaces with the utility company server to achieve these ends—in other words, the instructions to download and delete applications come from a different device to that (the CAD) which hosts the applications.

There are four participants in the process to download an application: a user device 402 such as a smartphone which has the utility company CAD Application installed, the consumer's CAD 404, the utility company server 406 and the CAD App Store 408. Only the first three of these are involved in the deletion of an application from the CAD. The Figure does not include any steps to recoup the cost of the CAD application but this may be implemented in known manner. For example, the cost may be applied at download or upon execution of the application. Income may be shared between the application provider and the energy company or CAD App Store provider.

The process for downloading an application to the CAD is initiated by the user device sending an application menu request 410 to the server 406. The server, at step 412, consults a record of the applications already installed in the CAD 404 and, if there is insufficient memory in the CAD 404, informs the consumer (not shown) via user device 402. In the event that there are different capabilities or generations of CAD such that not all CADs can execute all of the applications, the server also performs a check on the applications that are suitable for the particular CAD 404 (although this could equally be performed by the CAD App Store). The server then requests an app menu from the CAD App Store 408 at step 414. The request may indicate any limits on the suitable applications as appropriate. The CAD App Store replies at step 416 with a suitable menu of applications and the server 406 forwards the menu to the user device 402 at step 418.

The consumer can then review the available CAD applications on their device and select one to download at step 420. This review can include considering how much secure consumption data is provided to the application and whether the cost of the application (if any) is acceptable. At step 422 the user device sends a download request to the server which forwards the request to the CAD App Store at step 424. The CAD App Store obtains the relevant image at step 426 and sends it to the CAD 404 at step 428. The CAD then installs the application at step 430 after an optional confirmation (not shown) from the consumer via their user device and the server.

In the preferred embodiment, the application and accompanying files are stored in a Docker™ container ready for execution by the CAD. While Docker™ provides an efficient use of processer and memory resources by sharing kernel resources between applications (or containers), a virtual machine architecture could alternatively be used.

Figure 5:
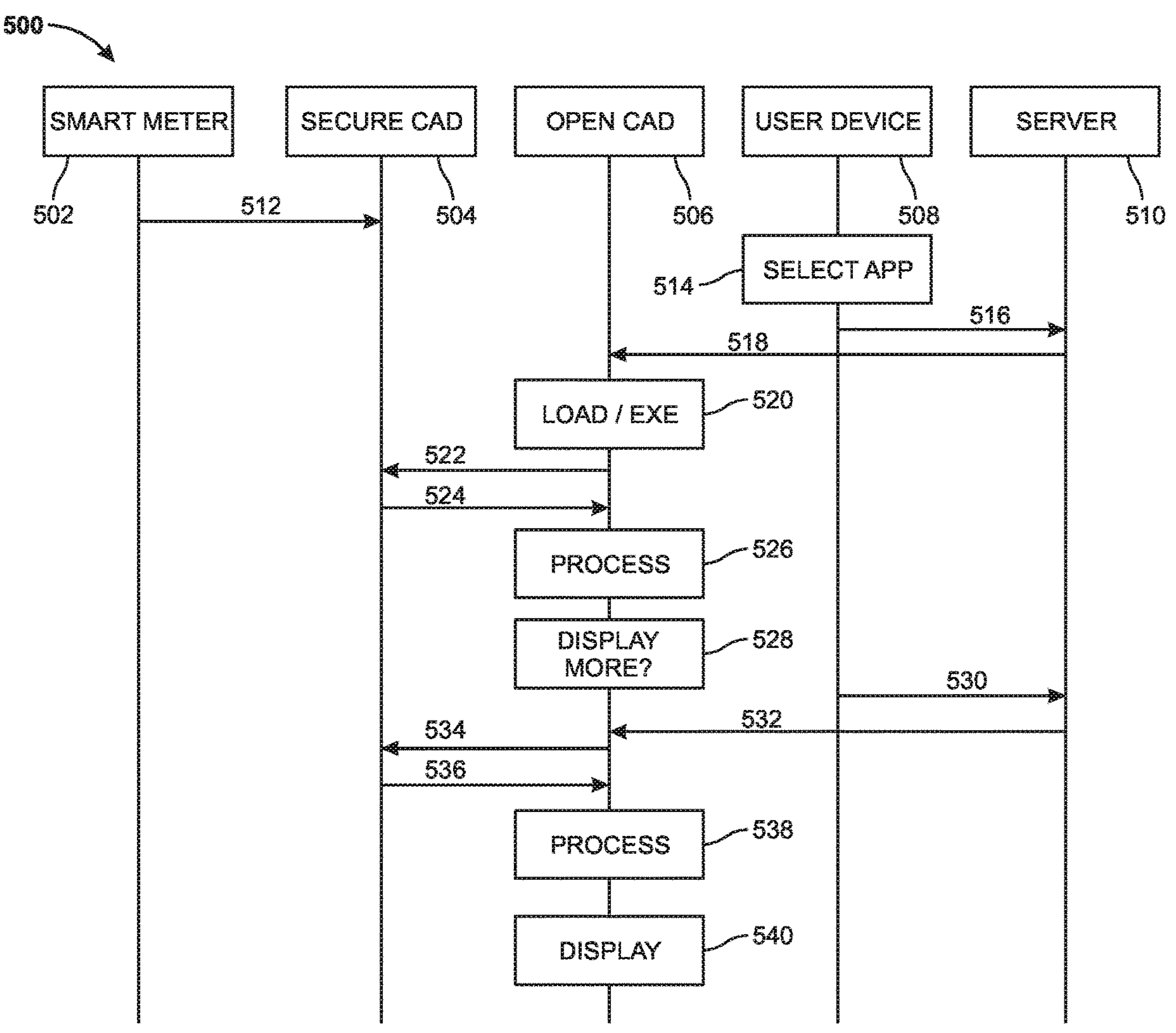
FIG. 5 shows the steps of execution of a third party application downloaded to the CAD.

The CAD confirms to the server that the installation has been successful at step 432 and the server updates the log of the applications installed in the CAD 404 at step 434. The server also sends, at step 436, a confirmation message to the user device 402 that the application has been successfully installed in the CAD and the CAD communicates this to the consumer at step 438. The following FIG. 5 illustrates the execution of an application by the CAD.

While the CAD App Store is populated by in-house and third party applications in known manner, particular care is taken by the utility company (or other administrator of the CAD App Store) with regard to security. As will be described below, certain CAD applications receive sensitive consumer data during their execution and care should be taken to ensure that this data cannot be obtained in an unauthorised manner.

FIG. 4 also shows the process for deletion of an application from the CAD. At step 450, the consumer reviews a list of the installed CAD applications via the Smart Energy app on their user device 402. The steps shown in the figure assume that the user device maintains a local list of the applications installed on the CAD. If there is no such list, then the user device can request and receive the list (not shown) from the utility company server 406 (or possibly the CAD App Store 408). Using the UI of their user device the consumer identifies, at step 452, one of the CAD applications for removal from the CAD. The user device sends the removal request to the server 406 at step 454 and the server requests a confirmation at step 456. The consumer confirms the deletion at step 458 and this is communicated to the server at step 460. The server then sends a delete application message to the CAD at step 462 and the CAD executes an application removal routine at step 464 to delete the application from memory and so on.

The CAD confirms the deletion of the application to the server at step 466 and this is relayed to the user device at step 468. At step 470, the user device confirms to the consumer that the application has been deleted and updates a local list of installed CAD applications if such a list is maintained.

The skilled person will appreciate that, in common with the other flow diagrams described here, various steps have been omitted for clarity such as handshaking and security requirements such as exchange and confirmation of secure tokens.

FIG. 5 shows a flow diagram 500 of execution of an application by a CAD. There are five participants in the process: smart meter 502, secure CAD 504, open CAD 506, user device 508 and utility company server 510. The reference to secure CAD and open CAD are actually to the same device but divided into the secure portion that receives the 10-second data from the smart meter (or CT clamp) and the open portion that is programmed to download and execute third-party applications from the CAD App Store as discussed with reference to FIG. 4. In FIG. 5, therefore, the CAD plays two separate roles. In the first role, referred to as open CAD 506, the processor is under the control of one of the applications in conventional manner. In this role, the processor has no access to the secure energy consumption data-only having access to such data as is stored in the Docker™ container for the current application. In the second role, referred to as secure CAD 504, the processor is under the control of secure software and is operable to receive and store the secure data from the smart meter as well as respond to requests for data from applications.

At step 512, the smart meter transmits the 10-second data to the secure CAD meaning that the processor 202 in the CAD receives the secure data from the ZigBee™ transceiver 204 and stores it in secure memory. This step repeats automatically every 10 seconds (or other frequent interval) and will not be repeated in the figure.

At step 514, a consumer selects an application to execute using their user device 508 and the user device sends this request to the server 510 at step 516. The application requested in this example is one that requires energy consumption data to execute. The server then informs the open CAD at step 518 that the consumer wishes to execute the application and the open CAD loads and executes the application at step 520.

The first function of the application running on the open CAD is to request consumption data from the secure CAD at step 522. The application will typically include security credentials in this request so that the secure CAD can verify that the application is authorised to obtain such information. This can be done using a public/private key pair in which the request from the open CAD is encrypted using a private key which the secure CAD can decrypt using a public key. Since the energy company may charge for the data, the application's security credentials may be stored to settle any repudiation disputes.

Assuming that the credentials of the application are valid, the secure CAD responds at step 524 with the requested data. The data can be provided directly to the Docker™ container corresponding to the application which should ensure that access to that data is restricted to only that application. (It will be appreciated that it is important to ensure that third party software cannot "sniff" data to which it is not entitled.)

Alternatively, the data is provided in encrypted form and the application running on the open CAD decrypts and processes the data at step 526 before displaying the processed data to the consumer at step 528. The display of data is accompanied by a question as to whether the consumer would like more information. At step 530, the consumer requests further information of the server 510 via their user device and at step 532 the server forwards this request to the open CAD.

This triggers a request and return of new data at steps 534 and 536 which are analogous to steps 522 and 524 described previously. The new data is then decrypted and processed at step 538 before being displayed at step 540. The application terminates after a predetermined time during which no further consumer requests are received.

While public/private key security has been described in this embodiment, the skilled reader will appreciate that other techniques are available for conveying the sensitive consumer data from the secure CAD to the application running on the open CAD.

While FIG. 5 shows an application being executed in response to a consumer request it will be understood that the CAD may execute applications automatically without any intervention from the consumer. One option is for the CAD to execute each of the applications in sequence for a fixed duration and then proceed to the next application. The fixed duration may be different for different applications. See also the example given in the context of FIG. 2.

Another option is for the CAD to execute background applications continuously and then execute other applications, such as games, only in response to a consumer request. One type of background application comprises a warning application that monitors consumption data and compares that data with historic data and/or predetermined parameter limits. Out of character or excessive consumption would then trigger an alarm. For example, a background application could monitor overall electricity consumption and compare that with different limits at different times of day. An alarm could be triggered if consumption before 6 am or after 11 pm exceeds 1 kW. Artificial Intelligence (AI) could be applied to learn household consumption patterns over a day, week and year, triggering an alarm if actual consumption deviates significantly from those learned patterns. Perhaps the consumer has bought an electric car and the alarm has been triggered by charging the car. The consumer would then be able to disable the alarm and the AI would learn that this new pattern of behaviour is acceptable.

Figure 6:
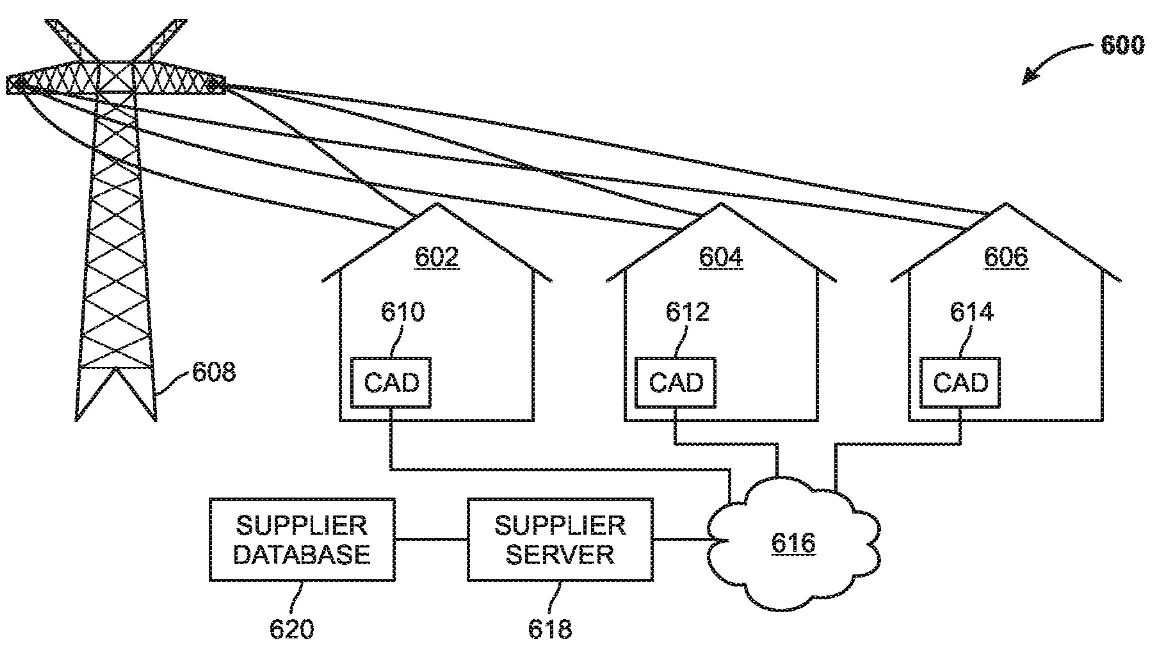
FIG. 6 shows three houses each having a home area network.

FIG. 6 shows a number of properties 600 that each have a CAD largely as disclosed previously. Three houses 602, 604, 606 each have an electricity supply from an electricity network 608. Each house also has a respective CAD 610, 612, 614 which are all connected to a supplier server 618 via the internet 616 and also to receive the 10 second data. This arrangement allows the consumers resident in the three houses to link their CADs allowing them to message one another and compete over energy usage or via games.

The CADs 610, 612 and 614 differ in two respects from the CAD described previously. Firstly, they are programmed to both initiate and respond to link requests between CADs. Secondly, these CADs do not necessarily permit applications to be downloaded, although this feature may be included if desired.

The supplier server hosts or has access to a database 620 of all of the consumers served by that supplier. The database stores details of which consumer's CADs have been linked. The linking process will be described with reference to FIG. 7.

Figure 7:
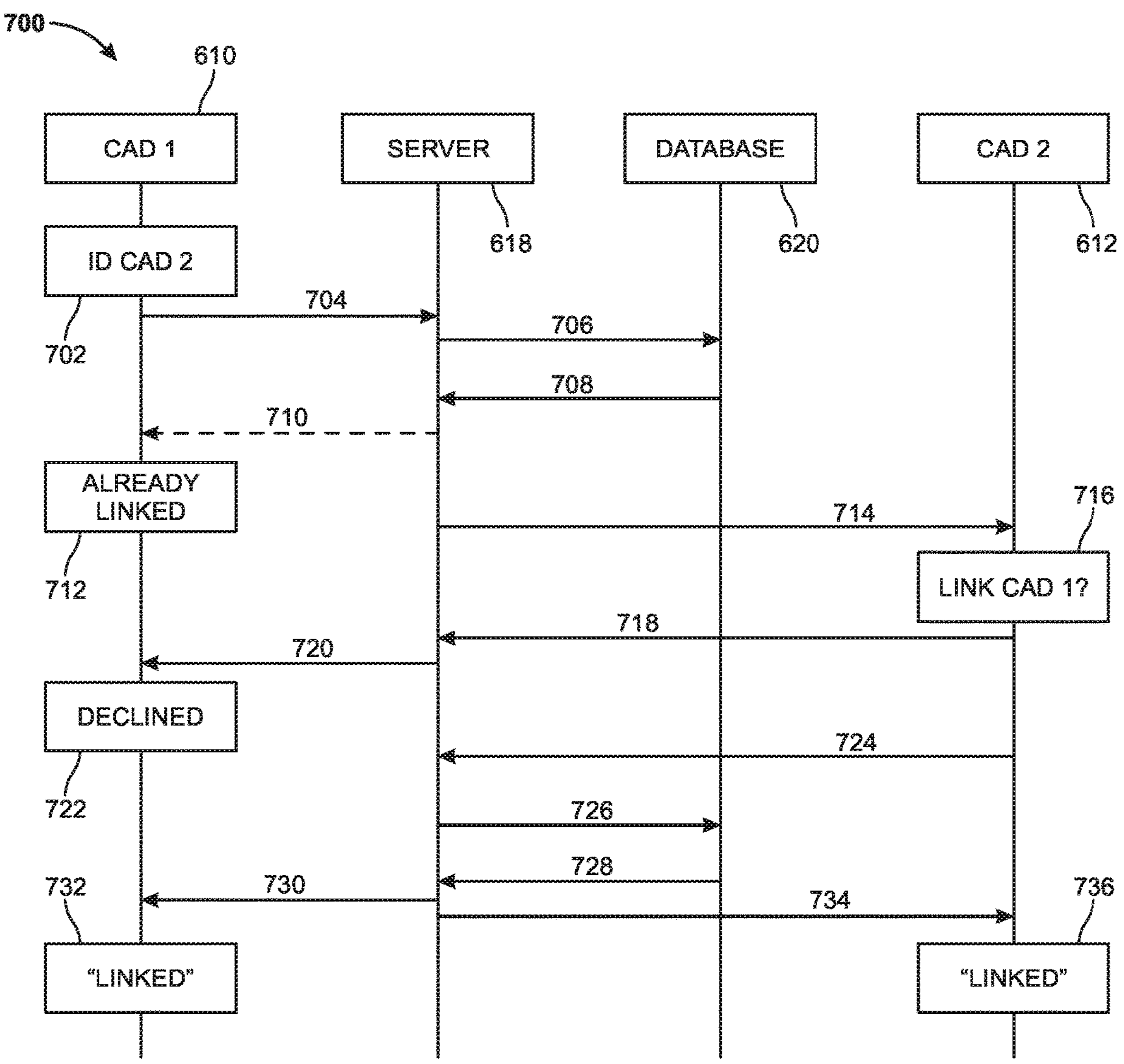
FIG. 7 shows the steps to identifying another consumer having a CAD.

FIG. 7 is a flow diagram showing an example of how the CAD linking takes place. Imagine that a consumer in property 602 wishes to link his or her CAD 610 to the CAD 612 in their friend's property 604. There are four participants in the process: the CAD 610, the utility supplier server 618, the database 620 and the CAD 612.

The process begins at step 702 by identifying the friend's CAD 612. The consumer at property 602 informs their CAD 610 of their friend's identity. This can be done in a variety of ways, for example, the unique CAD ID, the address of the friend's house 604, the unique ID of the smart meter installed in the house 604 or the full name of the consumer at property 604. At step 704, the CAD 610 sends a linking request signal to the server 618 which identifies the CAD 612.

The server then checks with the database 620 to determine whether the consumers at properties 602 and 604 have been properly identified (i.e. they exist in the database) and are in good standing (i.e. have no outstanding debts to the utility supplier.) At step 706 the server 618 queries the database about the two consumers and at step 708 the database replies—in this case "yes" that the two consumers exist and are in good standing. Optionally, the database may also determine whether the two consumers are already linked and inform the server 618 at step 710. Where the two consumer's CADs are already linked, the server will inform the consumer at step 712 and the process will end.

Assuming that the two CADs are not already linked, the server 618 will send an invitation 714 to the CAD 612 which invitation will include sufficient data about the consumer at property 602 to allow the consumer at property 604 to identify the person making the request such as their name, address and so on. This invitation is communicated to the consumer at property 604 at step 716. If the consumer at property 604 does not want to link their CAD 612 to the CAD 610 then the CAD 612 will send a decline message 718 to the utility server which in turn sends a decline message 720 to the CAD 610. The CAD 610, at step 722, communicates this news to the consumer at property 602 and the process ends.

Assuming that the consumer at property 604 does want to link their CAD to the CAD 610 then the CAD 612 will send an accept response 724 to the server 618. The server informs the database 620 at step 726 to mark the records of the two consumers as being linked and the database confirms that this has been done at step 728. The server then sends a message 730 to the CAD 610 confirming that it is now linked to CAD 612 and the CAD 610 communicates this to the consumer at step 732. The server also sends a message 734 to the CAD 612 confirming that it is now linked to the CAD 610 and this is conveyed to the consumer at step 736.

The skilled reader will appreciate that some of these steps could be eliminated—for example the CAD 612 may infer that it is now linked to the CAD 610 once the accept message 724 is sent. Possible further messages, handshakes, reminders in the absence of replies and so on will also be apparent to the skilled reader. For example, the server may inform each of the two CADs which applications are installed in the other CAD or confirm to one CAD that a particular application is installed at the other CAD (subject to the relevant consent from the consumer(s)). The server 618 and/or database 620 may or may not be shared with other utility supplier functions such as customer billing.

The process can be extended to also link to the CAD 614 in premises 606 (FIG. 6) and the skilled reader will understand that a group of CADs (i.e. more than two) could be linked to allow multiple consumers to participate in a game via their respective CADs.

Figure 8:
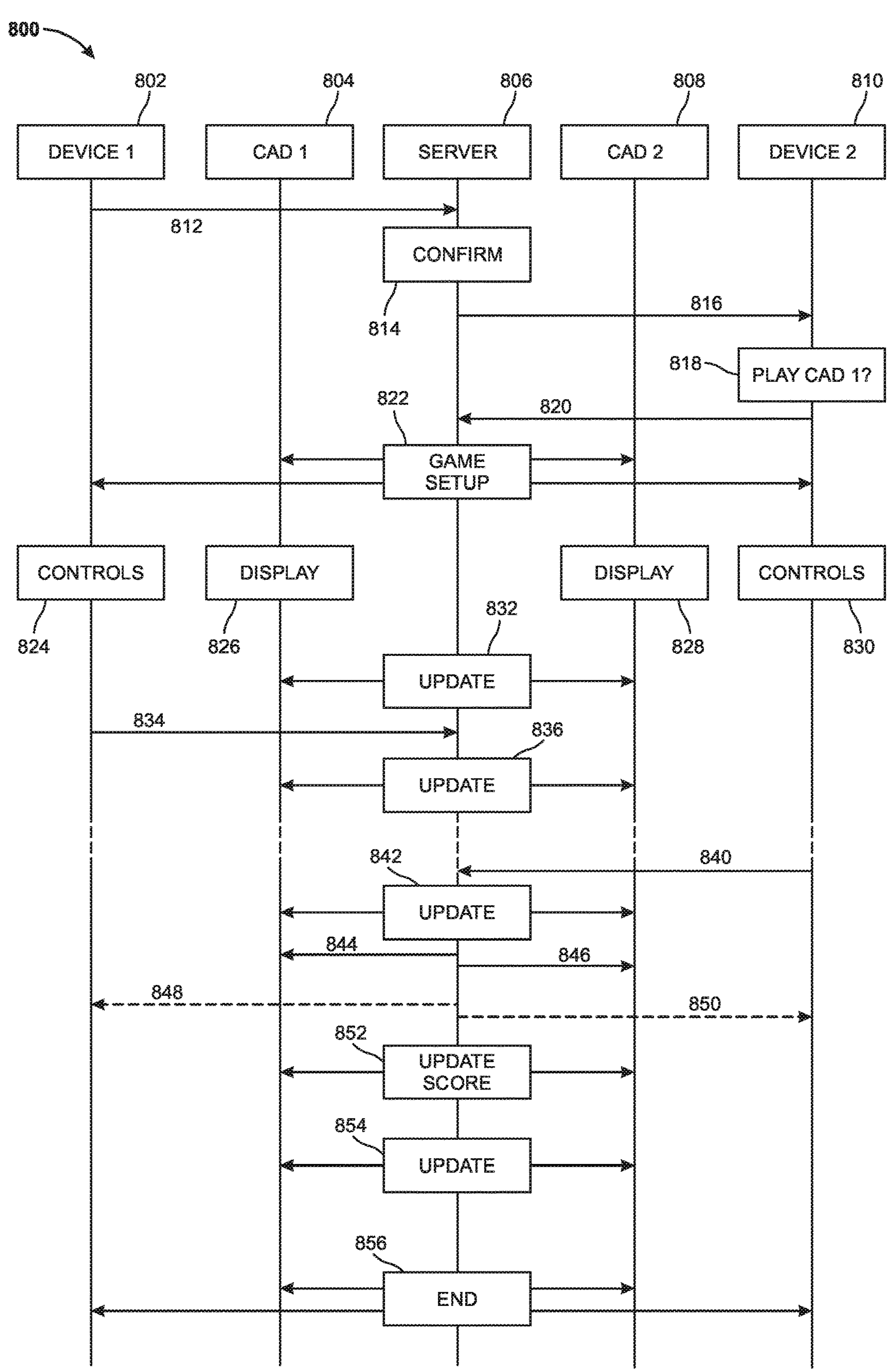
FIG. 8 shows the steps to executing interacting applications on two separate CADs.

FIG. 8 is a flow diagram of how a game may be played on CADs linked as described above. Many two (or more) player games provide suitable applications for CADs but the games are preferably related to energy consumption so that family and friends actually compete to either use less of a utility or improve utility consumption (such as shifting consumption in time to coincide with low tariff(s)). The utility company server may be arranged to preserve confidentiality of consumer data by only providing the other party's CAD either with a summary of the other consumer's energy consumption or an indication of who is winning which could simply be a WIN/LOSE indication.

The CAD is preferably pre-programmed with a multiplayer game such as Pong to encourage consumers to link their CADs with those of family and friends. Applications, such as those developed by third parties, may also be downloaded to the CAD if that facility is provided. The process of FIG. 4 applies.

FIG. 8 shows five participants to provide the game (Pong in this example)—a first user device 802, a first CAD 804, a utility company server 806, a second CAD 808 and a second user device 810. The first user device is the one associated with the first CAD and the second user device is the one associated with the second CAD.

The process starts with the first consumer requesting a game with a second consumer by using their application to send a request (which identifies CAD 808 and the proposed game in some manner) to the server at step 812. At step 814, the server confirms the identity of the second CAD 808 and that the first and second CADs are linked as described above. Assuming that the CADs are linked, the server sends a request to the application on the second user device to play the game with the consumer associated with the first CAD at step 816. The user device 810 poses the question to the consumer at step 818 and, assuming that the response at step 820 is positive, the server sets up the game at step 822. The game setup includes messages to each CAD and to each user device. In response the two user devices display the necessary controls (UP/DOWN buttons to control the paddle) at steps 824 and 830 and the CADs display the game at steps 826 and 828 (including a ball and two paddles) as well as the score. From this point on, the server sends the same instructions to each CAD so that the two consumers see exactly the same gameplay.

The server sends an update signal at step 832 so that the ball is moved on the display of the two CADs. Since the ball is moving towards the side of the court defended by the first consumer, they press the UP button on their user device and this is communicated to the server at step 834. As a consequence, the server sends an update signal to both CADs at step 836, showing that the paddle of the first consumer has moved up. This update signal will typically also update the position of the ball.

The game continues (dotted lines in the Figure) with periodic updates from the server instructing the CADs regarding the position of the ball (and paddles, should they have moved). The server also responds to paddle control messages from the first and second device. Assuming that the first consumer successfully hits the ball with their paddle, the ball will head towards the side of the court defended by the second consumer. The second user device then requests movement of the paddle down at step 840 which is reflected in the next update 842 provided by the server. These steps are repeated until one player misses the ball. Assuming that the second player misses the ball, the server instructs the first CAD to display "YOU WIN" at step 844 and the second CAD to display "YOU LOSE" at step 846. Optionally, the server may also instruct the first and second user devices to display messages to their respective players at steps 848 and 850. The server then instructs each CAD to update the score at step 852 and commences another point at step 854.

The game ends at step 856 when one of the players reaches a predetermined target score. Various options (not shown) to play another game, enter a high-score table or quit may be offered to the players as will be understood.

For ease of description, the two-player game described with reference to FIG. 8 does not make any reference to energy consumption data. To provide games or other applications that do make reference to such data then the CAD can be additionally arranged to perform the secure-data transmission processes described with reference to FIG. 5. In order to ensure that sensitive data from the first CAD is not transmitted to the second CAD (and vice versa), the server can perform a role to conceal or at least abstract such data. It will be appreciated that, in order for two households to play an energy-consumption based game, they will each necessarily learn something about each other's energy use. At the lowest (and most secure) level this could be as simple as learning that the other premises used more energy than yours over a given time period (such as 24 hours).

To provide a better degree of interaction between the players, however, each CAD will need to obtain some information that conveys a greater granularity of energy consumption in the other premises. In this case either the originating CAD or the server may abstract the information to some degree, thus preserving the confidentiality of data. Alternatively or in addition, the server may arbitrate between data from each premises to provide a result so that no raw data from either CAD is conveyed to the other one.

One abstraction technique that may be applied is to reduce the granularity of the data in time, i.e. to aggregate usage data over longer time period. 10-second data from a smart meter may be analysed to infer a great deal of information about the household-even to the extent of which appliances are switched on at which times. By reducing the granularity of the data in time, for example to 1 minute or 5 minute periods any such inferences will be much less accurate. The granularity of the data may alternatively, or additionally, be reduced in energy terms by using ranges. For example, instead of reporting the household consumption as 4.7 kW it could be reported as between 3 kW and 6 kW. The following table illustrates a reduction in the granularity of the 10-second data in both time and accuracy.

| Time period | 10 s | 20 s | 30 s | 40 s | 50 s | 60 s | 70 s | 80 s | 90 s |
|---|---|---|---|---|---|---|---|---|---|
| Power consumption | 3.2 kW | 2.8 kW | 2.4 kW | 2.6 kW | 2.5 kW | 2.4 kW | 1.0 kW | 0.85 kW | 0.7 kW |
| 30 second average | | 2.8 kW | | | 2.5 kW | | | 0.85 kW | |
| Range | | 1-3 kW | | | 1-3 kW | | | 0.5-1 kW | |

By averaging the power consumption over 30 seconds, the granularity of the data is reduced in time. By then placing those averaged values in separate "bins" the granularity of the data is also reduced in quantitative terms. The length of time over which the average is taken and the size of the "bins" can be adjusted to balance the requirements of gameplay and sensitivity of consumers to sharing of information.

This abstraction process is also applicable to data that the server may receive directly from the smart meter in a premises as well as data that is conveyed to the server via the CAD.

The consumer may be required to consent to the provision of consumption information in order to download and participate in the game. The energy supplier or manufacturer of the CAD may provide the consumer with a number of options to simplify this process. For example, provision of accurate data at frequent time intervals would correspond with a low security option while identifying consumption only by way of a wide "bin" and infrequent time would correspond with a high security option. The application developers can then decide how frequent and accurate the information needs to be for their needs.

Such data may be used for a live comparison dashboard shown to competing consumers which may change to green when they are winning (i.e. using less energy than their friends) and red when they are losing. Such comparisons may be made over a day, a week or longer period and a chart could be provided so that a historical performance comparison is possible. This type of "game" does not need any interaction from the consumers (other than initiating the application and possibly selecting a particular card or cards to view). Thus an interactive application between two or more CADs can also be a "background" application.

For a more serious application, a friend or family member may link their CAD to the CAD of a vulnerable consumer, such as an elderly consumer. An application on the vulnerable consumer's CAD is then provided that alerts the friend or family member's CAD of some potentially problematic situations. These might include excessive energy consumption such as a continual supply of gas (perhaps indicating that a gas ring has been left on) or insufficient energy consumption (perhaps indicating that the vulnerable person is unable to move to activate their appliances). More sophisticated policies could, of course, be implemented, perhaps using Artificial Intelligence to learn the vulnerable consumer's behaviour.

Figure 9:
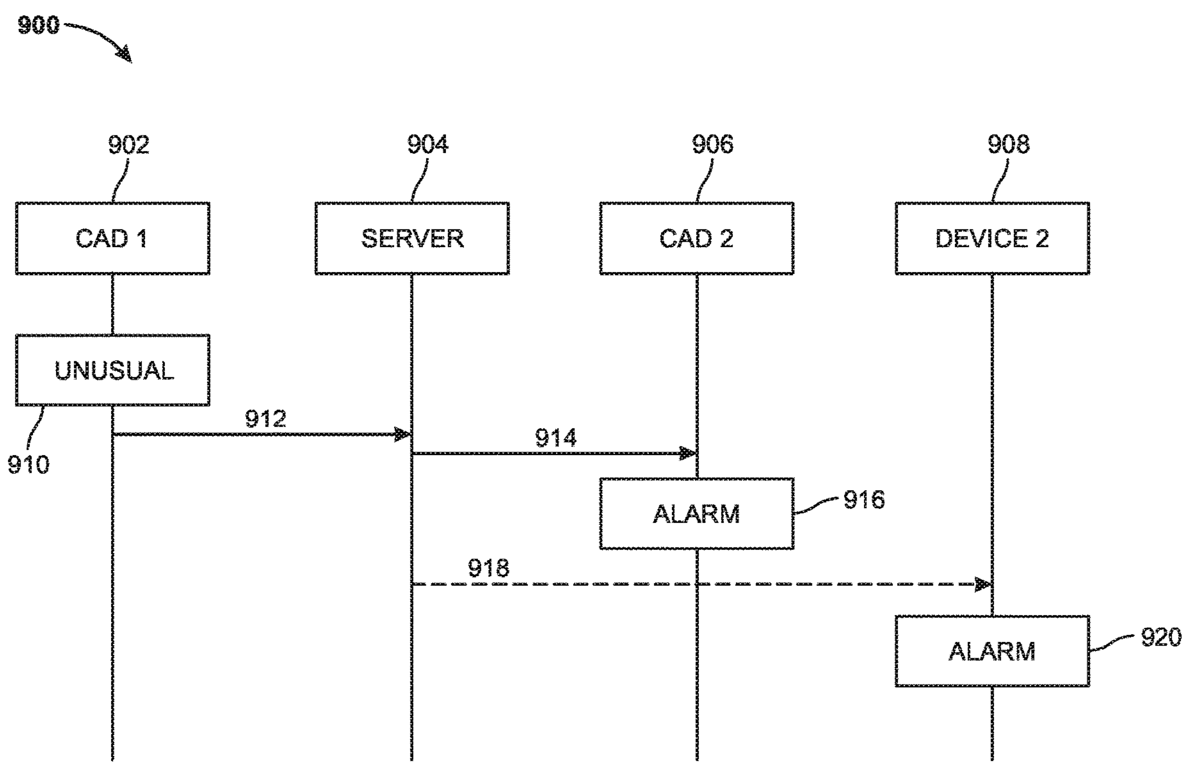
FIG. 9 shows the steps of CAD-to-CAD communication between linked CADs.

FIG. 9 shows a flow diagram 900 of one example of such a process. There are four participants in the diagram: a first CAD 902 (located, for example, at the home of a vulnerable consumer), a utility company server 904, a second CAD 906 (located, for example at the house of a relative of the vulnerable consumer) and the user device 908 associated with the second CAD.

The first CAD 902 is loaded with an application that identifies uncharacteristic utility consumption behaviour. This could be based on the energy consumption in the household exceeding predetermined limits, a machine learning algorithm arranged to compare current energy usage with historical behaviour or a combination of the two. At step 910, the first CAD executes this application and determines that the current behaviour is uncharacteristic of the consumer. At step 912, the first CAD sends an alarm signal to the server 904 which the server forwards, at step 914, to the second CAD. The second CAD responds by providing an alarm (visual and/or audible) at step 916. This gives the second consumer the opportunity to check on the vulnerable consumer. The sending step 914 may be duplicated for other CADs such as those associated with other family members of the vulnerable person.

FIG. 9 also shows an optional step 918 in which the server also sends an alarm signal to the user device (or devices) associated with the second CAD and the user device sounds the alarm at step 910. This gives the consumer associated with the second CAD the opportunity to be warned about the vulnerable consumer even when they are not at home.

In a variation of this embodiment, the server may additionally be programmed to assess the consumption data of consumers that have been identified as vulnerable and send an alarm message to one or more designated CADs and user devices in response to uncharacteristic patterns. The vulnerable consumer may also have the option to clear the alarm status of their CAD so that their friends or family don't worry unnecessarily.

FIGS. 8 and 9 describe communication between CADs via a server. While this provides excellent control of the process from the perspective of the utility company, it does imply a significant computing and communication overhead. As an alternative, the CADs may be linked via a peer-to-peer architecture, managed by the server. Time or activity-limited connections between CADs are set up on instruction from the server and renewed as appropriate. The server may maintain as much oversight as desired. When data is to be shared, the originating CAD or CADs will have to perform any required abstraction of the transmitted data.

The invention claimed is:

1. A consumer access device for a smart energy system, the consumer access device comprising:
- a processor,
- first memory for storing at least one application,
- second memory for secure storage of data representing utility usage,
- a first transceiver configured to communicate with a domestic smart meter or Current Transformer (CT) clamp to receive secure utility data representing utility usage from the domestic smart meter or CT clamp, and
- a second transceiver configured to communicate with at least one server,
- the processor being programmed to store the secure utility data representing the utility usage received via the first transceiver in the second memory,
- the processor also being programmed to execute at least one application stored in the first memory,
- the processor further being programmed to request that the server establish a link with another consumer access device,
- the processor additionally being programmed to respond to a request from a server to establish a link with at least one further consumer access device, to accept the request.

2. The consumer access device of claim 1, further comprising a display.

3. The consumer access device of claim 1, wherein the processor is further programmed to obtain confirmation from a consumer prior to accepting the request from the server.

4. The consumer access device of claim 1, wherein the processor is further programmed to download applications to the first memory.

5. The consumer access device of claim 1, wherein the processor is further programmed to pair with at least one user device to provide a user interface.

6. The consumer access device of claim 1, further comprising a third transceiver comprising a short range wireless transceiver.

7. The consumer access device of claim 6 wherein the third transceiver comprises a Bluetooth™ transceiver.

8. The consumer access device of claim 1, wherein the first transceiver comprises a ZigBee™ transceiver, and/or wherein the second transceiver comprises a WiFi™ transceiver.

9. The consumer access device of claim 1, wherein the processor is further programmed to receive utility data representing consumption of more than one utility.

10. A method of linking at least first and second consumer access devices located at separate premises in a smart energy system so that, after linking, their respective consumers can interact via their respective consumer access devices, each of the first and second consumer access devices comprising a processor, first memory for storing at least one application, second memory for secure storage of secure utility data representing utility usage, a first transceiver configured to connect to a respective smart energy meter or Current Transformer (CT) clamp to receive the secure utility data from the respective smart meter or CT clamp, and a second transceiver configured to communicate with at least one server, the processor being programmed to store the secure utility data received via the first transceiver in the second memory, the processor also being programmed to execute at least one application stored in the first memory, the processor further being programmed to request that the at least one server establish a link with another consumer access device, the processor additionally being programmed to respond to a request from the server to establish a link with the another consumer access device, to accept the request, the method performed by the server and comprising:

receiving, from the first consumer access device or a first user device associated with the first consumer access device, an indication of the identity of another consumer, confirming that the another consumer has the second consumer access device, sending an invitation to the second consumer access device or to a second user device associated with the second consumer access device, the invitation identifying the consumer associated with the first consumer access device, and in response to a positive reply from the second consumer access device or from the second user device associated with the second consumer access device, storing data identifying that the first and second consumer access devices are linked and communicating link data to the first and second consumer access devices to enable the first and second consumer access devices to link to each other and to interact with each other after linking.

11. The method of claim 10, wherein the link data communicated to the first and second consumer access devices comprises address data for a peer-to-peer connection between the first and second consumer devices.

12. The method of claim 10, wherein the indication of the identity of the another consumer comprises at least one of street address, customer number, customer name, postal code and property number, and unique consumer access device identity.

13. A method of communicating first data to both a first consumer access device and a second consumer access device, each of the first and second consumer access devices comprising a processor, first memory for storing at least one application, second memory for secure storage of data representing utility usage, a first transceiver configured to communicate with a domestic smart meter or Current Transformer (CT) clamp to receive second data comprising secure utility data representing utility usage from the domestic smart meter or CT clamp, and a second transceiver configured to communicate with at least one server, the processor being programmed to store the second data received via the first transceiver in the second memory, the processor also being programmed to execute at least one application stored in the first memory, the processor further being programmed to request that the server establish a link with another consumer access device, the processor additionally being programmed to respond to a request from a server to establish a link with at least one further consumer access device, to accept the request, the method comprising:

receiving, at a server, a request from the first consumer access device or a first user device associated with the first consumer access device to communicate first data to the first and second consumer access devices, confirming that the first and second consumer access devices comprise linked consumer access devices, and communicating the first data to the first and second consumer access devices.

14. The method of claim 13, further comprising:

receiving, at the server, a request from the second consumer access device or a second user device associated with the second consumer access device to communicate first data to the first and second consumer access devices, and communicating the first data to the first and second consumer access devices.

15. The method of claim 13, wherein the server is further programmed to periodically transmit the same first data to the first and second consumer access devices.

16. A method of communicating data between a first consumer access device and a second consumer access device, each of the first and second consumer access devices comprising a processor, first memory for storing at least one application, second memory for secure storage of second data comprising secure utility data representing utility usage, a first transceiver configured to communicate with a domestic smart meter or Current Transformer (CT) clamp to receive the second data from the domestic smart meter or CT clamp, and a second transceiver configured to communicate with at least one server, the processor being programmed to store the second data received via the first transceiver in the second memory, the processor also being programmed to execute at least one application stored in the first memory, the processor further being programmed to request that the server establish a link with another consumer access device, the processor additionally being programmed to respond to a request from a server to establish a link with at least one further consumer access device, to accept the request, the method comprising:

receiving, at a server, a request from the first consumer access device to communicate first data to the second consumer access device, confirming that the first and second consumer access devices comprise linked consumer access devices, and sending the first data to the second consumer access device.

17. The method of claim 16, wherein the first data communicated to the second consumer device is alarm data in response to uncharacteristic energy consumption detected by the first consumer access device.

18. The method of claim 16, further comprising sending the first data to at least one user device associated with the second consumer access device.

19. A method of sharing energy usage data between at least a first consumer access device and a second consumer access device, each of the first and second consumer access devices comprising a processor, first memory for storing at least one application, second memory for secure storage of data comprising secure utility data representing utility usage, a first transceiver configured to communicate with a domestic smart meter or Current Transformer (CT) clamp to receive the secure utility data from the domestic smart meter or CT clamp, and a second transceiver configured to communicate with at least one server, the processor being programmed to store the secure utility data received via the first transceiver in the second memory, the processor also being programmed to execute at least one application stored in the first memory, the processor further being programmed to request that the server establish a link with another consumer access device, the processor additionally being programmed to respond to a request from a server to establish a link with at least one further consumer access device, to accept the request, the method comprising:

receiving energy usage data from the first consumer access device, and sending energy usage data to the second consumer access device.

20. The method of claim 19 wherein the sending of energy usage data occurs over a peer-to-peer connection, or via a server.

* * * * *